United States Patent
Caridis et al.

(10) Patent No.: US 8,231,919 B2
(45) Date of Patent: Jul. 31, 2012

(54) VERTICAL FLOW FRENCH FRYER

(75) Inventors: Andrew Anthony Caridis, San Carlos, CA (US); Thomas John Miller, Burlingame, CA (US)

(73) Assignee: Heat and Control Inc., Hayward, CA (US)

( * ) Notice: Subject to any disclaimer, the term of this patent is extended or adjusted under 35 U.S.C. 154(b) by 515 days.

(21) Appl. No.: 12/381,171

(22) Filed: Mar. 9, 2009

(65) Prior Publication Data
US 2010/0227035 A1    Sep. 9, 2010

(51) Int. Cl.
*A23L 1/01* (2006.01)
(52) U.S. Cl. ............. 426/438; 99/404; 99/408; 426/637
(58) Field of Classification Search .................. 426/438
See application file for complete search history.

(56) References Cited

U.S. PATENT DOCUMENTS
4,706,557 A * 11/1987 Feng et al. ........................ 99/355

OTHER PUBLICATIONS

Padilla: Fryer Systems Technology: Direct and Indirect Heated Systems; Cereal Food World; 1998; pub. No. W-1998-0702-01F.*

* cited by examiner

*Primary Examiner* — Patricia George
(74) *Attorney, Agent, or Firm* — Law Offices of Donald N. MacIntosh

(57) ABSTRACT

Cooking of French fried potatoes by facilitating a generally vertical arrangement of potato strips while in the frying operation is disclosed wherein the slices may be cooked within a very deep pack while oil is urged to flow upwardly through the pack and steam entrapment within the cooking slice pack is minimized. A conveyor belt carrying the slices through the cooker has a multiplicity of openings facilitating oil flow there through and the cooker is configured to permit oil discharge for reheating purposes both laterally and longitudinally of the processing path.

1 Claim, 7 Drawing Sheets

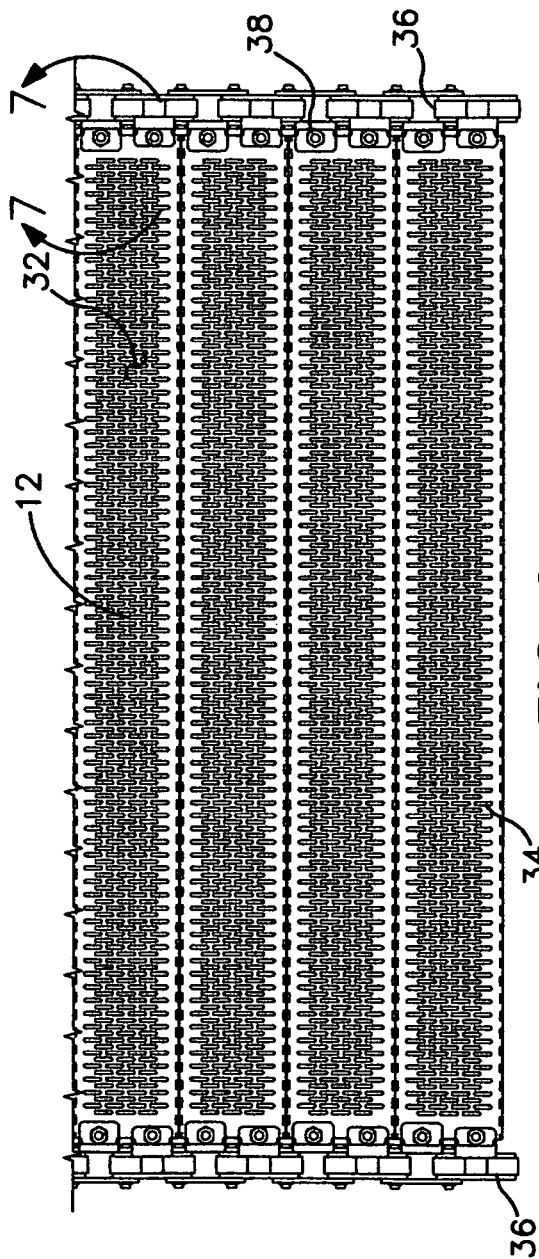
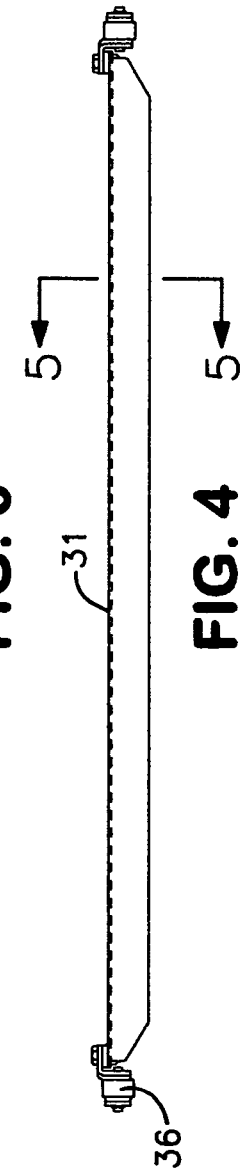
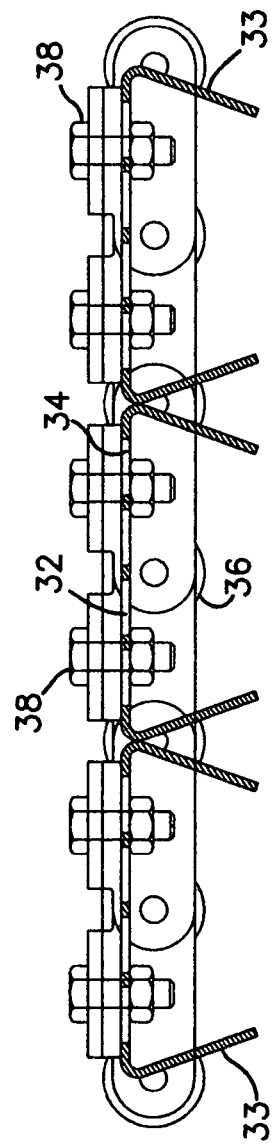
FIG. 6
FIG. 4
FIG. 5

VERTICAL FLOW FRENCH FRYER

TECHNICAL FIELD OF THE INVENTION

This invention concerns a method and apparatus for frying potato strips commonly called "French fried potatoes" and particularly relates to a continuous process for frying potato strips in large volumes from very deep packs of strips generally vertically arranged in the cooking oil.

BACKGROUND OF THE INVENTION

Most French fried potatoes produced within the process food industry have been prepared in a sequence of steps including the cutting of whole potato into a multiplicity of potato strips which are then blanched in hot water. A water removal or drying step follows which employs circulating air to remove surface water from the strips as well as a predetermined, partial removal of internal water prior to depositing the strips into a vat of hot cooking oil for a time period sufficient to reduce the moisture content of the potato strips to fall within a predetermined internal moisture range. Following removal from the cooking oil the strips are transferred to a quick freezer and then packaged for later finish frying before serving to customers. Some French fries are not frozen but chilled to be consumed within a short period after processing, usually not more than a few days. Other fries may not be processed by blanching and drying.

The prior art may embrace cooking of potato products as thin slices which float while frying, resulting in potato chips, a thin, dry brittle product. This is contrasted to cooking potato strips which sink while frying, resulting in the characteristic French fried potatoes which have body. In either field the frying step may occur in deep-frying apparatus having a vat to contain a volume of cooking oil with means serving for oil inputs and discharge including provisions for cooking oil re-heating and re-circulation with appropriate controls for cooking oil temperatures and product dwell time. The potato products were deposited in and removed from the vat of cooking oil via conveyors of various types or impelled along a process path by mechanical stirrers. In the case of potato strips the process time in the cooking oil was relatively short, as the finished moisture content of French fries falls in the range of 62% to 68%. This contrasts with potato slices which require substantially longer times in the cooking oil, the finishing moisture content of the resulting potato chips falls in the range of 1½% to 2%.

The Benson et al. U.S. Pat. No. 5,580,598, granted Dec. 3, 1996, disclosed flexibility in changeover from one processing method and product to another and taught mechanical means for stirring the products in the cooking oil as well as for urging the products along the processing path. The products and cooking oil moved concurrently through the cooker, being that cooking oil was introduced at the product feed end of the vat and removed at the product discharge end.

The Benson et al. U.S. Pat. No. 5,167,979, granted Dec. 1, 1992, disclosed control of the time-temperature curves in cooking oil to achieve various styles of potato chips from potato slices. These were moved along the processing path and agitated by mechanical means. Cooking oil inlets and outlets were shown arranged in the cooker bottom but it was not taught that the oil flow would determine the orientation of the potato slices during the cooking cycle, the mechanical agitating means determining that function.

The Haraldsson et al. U.S. Pat. No. 5,865,102, granted Feb. 2, 1999, disclosed deep frying potato slices in a pan having a plurality of cooking oil inlets and a plurality of cooking outlets, all located in the bottom of the pan. Lateral oil inlets were positioned in the sides of the pan to create turbulence in the cooking oil transversely of the longitudinal direction of the pan. The concept was to use turbulence to encourage separation of the potato slices while cooking in oil. Orientation of the slices in the cooking oil was not taught nor was control of steam generated from the cooking potato slices.

SUMMARY AND OBJECTS OF THE INVENTION

In summary, the invention resides in the method of continuous preparation of French fried potatoes from potato strips comprising the steps of providing a vat of cooking oil equipped with a product carrying conveyor capable of passing a current of cooking oil there through from an oil inlet disposed there below. Loading a volume of uncooked potato slices into the vat for carriage on the conveyor so as to build a pack of strips and to create a "boil" of steam from the strips, supplying cooking oil through the oil inlet at a volume and velocity to create an upward force vector acting with the "boil" to orient the strips in generally vertical positions thereby permitting steam to pass freely from the slice pack and then removing the slices from the vat while recirculating and reheating the cooking oil.

Another aspect of the invention resides in apparatus useful in the continuous cooking of French fried potato in a deep pack of uncooked strips. A fryer pan is configured with multiple cooking oil inlets in the bottom portion thereof through which oil is pumped into the pan in upwardly moving streams. A potato strip carrying conveyor having a belt through which oil moves readily extends the length of the pan and is inclined upwardly at a discharge end of the pan. Means are provided for removal of cooking oil at locations including at the product discharge end and along the sides of the conveyor.

A general object of this invention is to provide in the continuous preparation of French fried potatoes a process which enables the rapid escape of steam from a pack of potato strips during the deep frying step thereby promoting more uniform cooking of the potato strips and recognizing that without a vertical orientation of the strips the pack of strips inhibits the flow of oil through the pack because of generated steam creating steam pockets in the center of the pack which limits the operational depth of the pack.

Another object of this invention is to provide apparatus for continuous deep frying of potato strips in a vat of cooking oil that causes the strips to assume a generally vertical orientation during passage through the cooking oil.

Still another object of this invention is to provide in apparatus of the foregoing object means serving to create and maintain a force vector in the cooking oil directing the potato strips toward a non-supine orientation.

Yet another object of this invention is to provide a process and apparatus that enables the continuous cooking of potato strips in a pack thereof which is substantially double, or more, in depth from that of the prior art.

A further object of this invention is to provide a process and apparatus that greatly increases product output while promoting better product uniformity by affording dissipation of steam from the pack of potato strips while cooking.

Still another object of this invention is to provide a frying system containing substantially less cooking oil resulting in better oil quality due to faster turnover of oil as the carry out of the oil on the product is replaced with fresh cooking oil.

These and other objects of the present invention will be apparent from the following description of the preferred embodiments taken in association with the following drawings.

BRIEF DESCRIPTION OF THE DRAWINGS

FIGS. 4-7 are each detail views of the slat type product conveyor useful in the practice of the present inventions;

FIG. 10 is a fragmentary, conceptual view of the prior art methodology showing from within the pack of cooking potato strips the generally supinely orientated potato strips and the steam bubbles trapped within the pack inhibiting oil movement there through.

DESCRIPTION OF THE PREFERRED EMBODIMENTS

Figure 1:
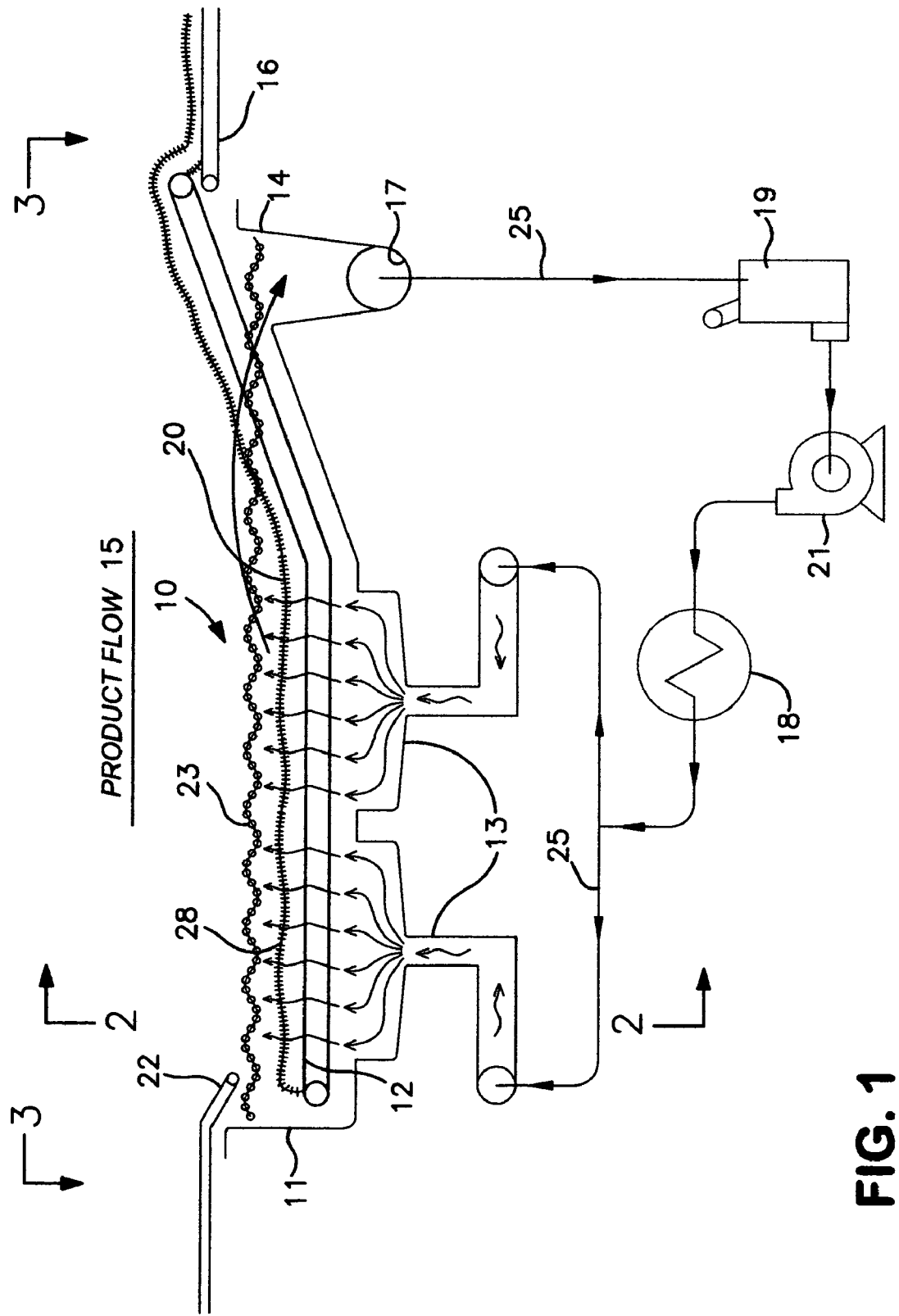
FIG. 1 is an elevation view, partially schematic, of the vertical flow French fryer apparatus configured to perform the processes of the present invention.

A vertical flow fryer 10 for cooking French fried potatoes from potato strips, made in accordance with and embodying the principles of the present inventions, is shown in FIG. 1. The vertical flow fryer 10 includes a fryer pan 11, a conveyor belt 12, and arrays of cooking oil inlets 13 arranged along the bottom wall of the pan 11. The pan 11, at a product discharge end 14, is inclined upwardly and the conveyor belt 12 traverses this incline so as to facilitate discharge of cooked slices unto a product discharge conveyor 16. An oil outlet sump 17 is disposed at the inclined discharge end 14 of the pan for receiving oil to be reheated in the heat exchanger 18, filtered 19 and returned via the oil pump 21 to the fryer pan 11 through the inlet manifolds 13. A product in feed conveyor 22 is mounted over the inlet end of the fryer pan 11, as shown in FIG. 1 for delivery of uncooked potato strips from potato cutting apparatus (not shown) into the hot cooking oil 23 contained in the pan 11 thereby creating a "boil" in the cooking oil as water is driven off the strips as steam. The energy released in the "boil" is utilized in the practice of the present inventions.

Figure 2:
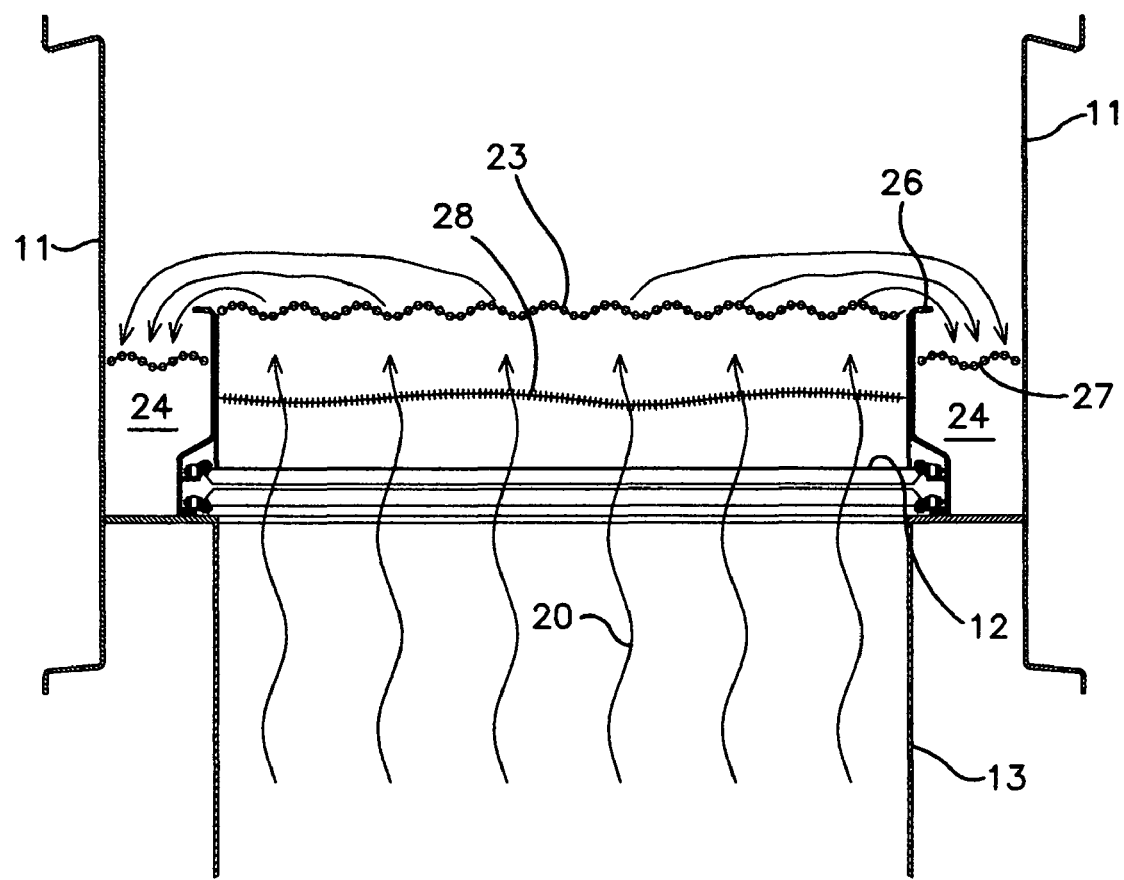
FIG. 2 is an enlarged sectional view taken in the direction of the arrows along the lines 2-2 of FIG. 1.

Referring now to FIGS. 1 and 2, the product carrying conveyor 12 is arranged in the fryer pan 11 inwardly of the pan sidewall so as to afford on each side of the conveyor 12 an oil flow channel 24 defined by the upstanding inner pan walls 26 spaced from the pan longitudinally extending side walls. The inner pan walls 26 at a lower portion thereof are integral with the conveyor frame as indicated in FIG. 2. At portions above the conveyor 12 belt and above the projected product load height the pan walls 26 are provided with flow-over edge flanges 27 so that cooking oil may well up trough the conveyor belt, through the product slice pack 28 and into the channels 24 from over the edge flanges 27 for return for filtering and reheating. The oil flow channels 24 serve as a conduit for the cooking oil to flow towards the oil outlet 17 at the discharge end of the pan.

Figure 3:
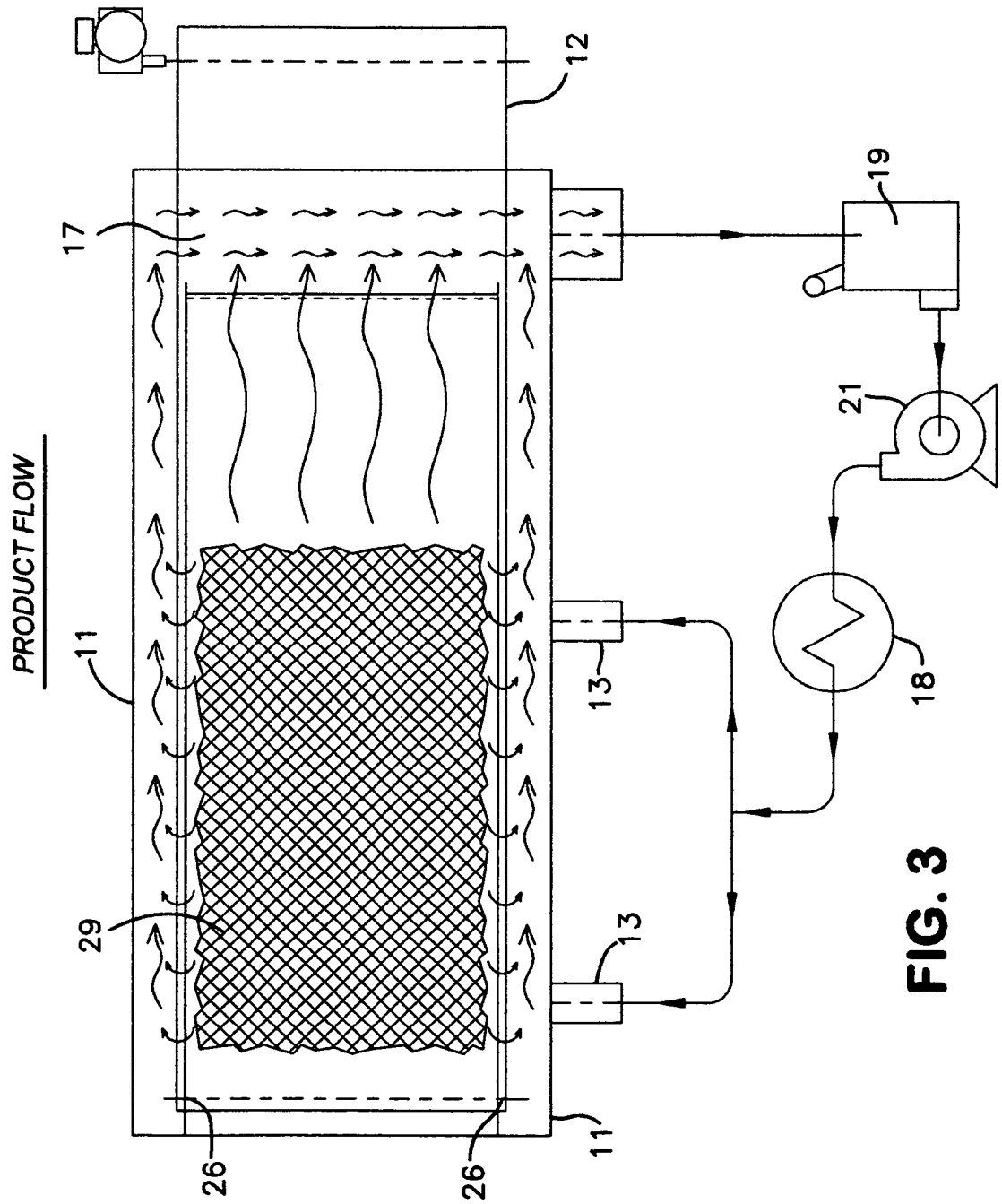
FIG. 3 is an enlarged plan view, partially broken away, taken in the direction of the arrows along the lines 3-3 of FIG. 1.
Figure 9:
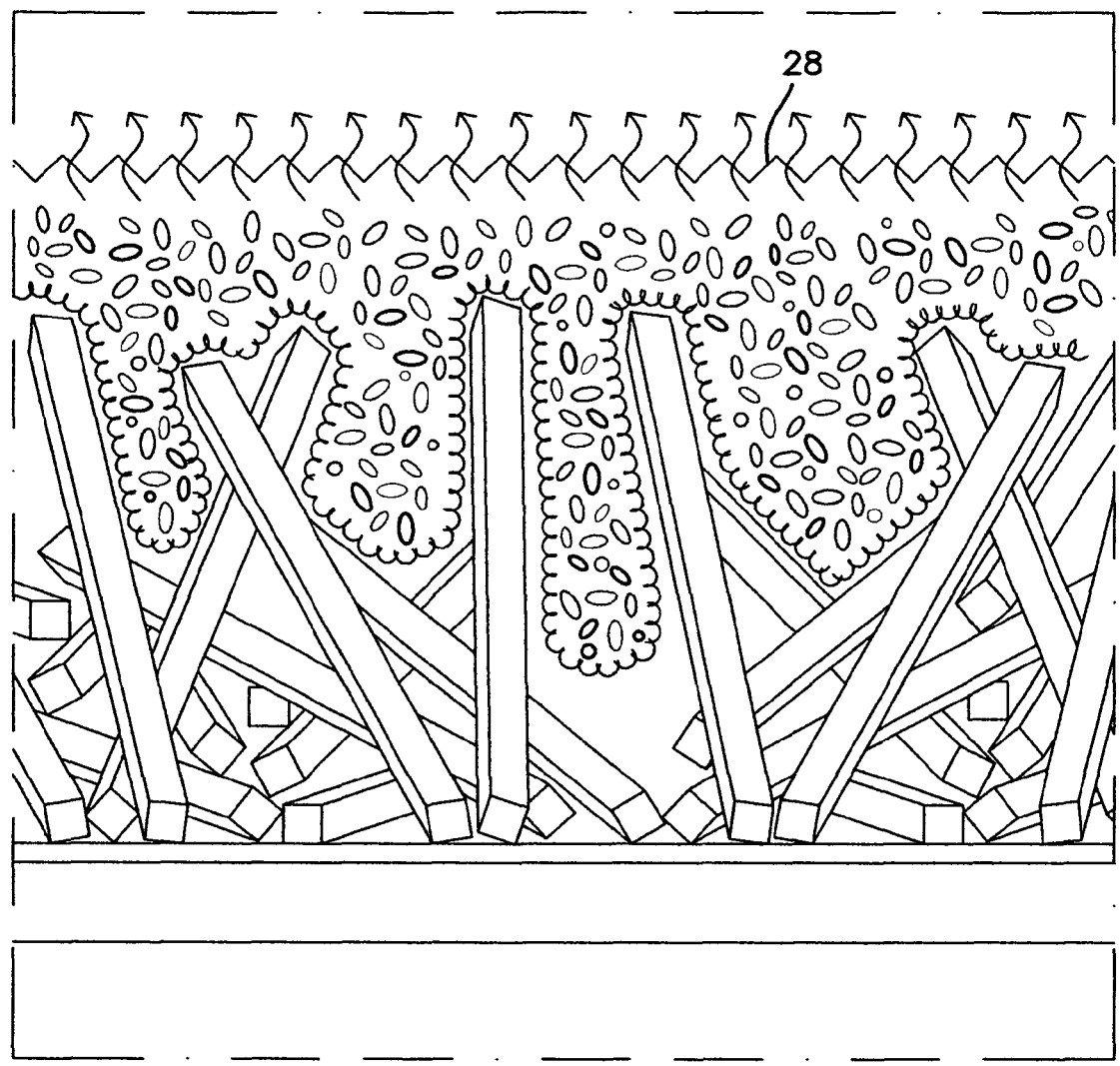
FIG. 9 is fragmentary, conceptual view showing from within the pack of cooking potato strips showing the generally vertically orientated potato slices and the steam bubbles emanating upwardly during the cooking process.
Figure 10:
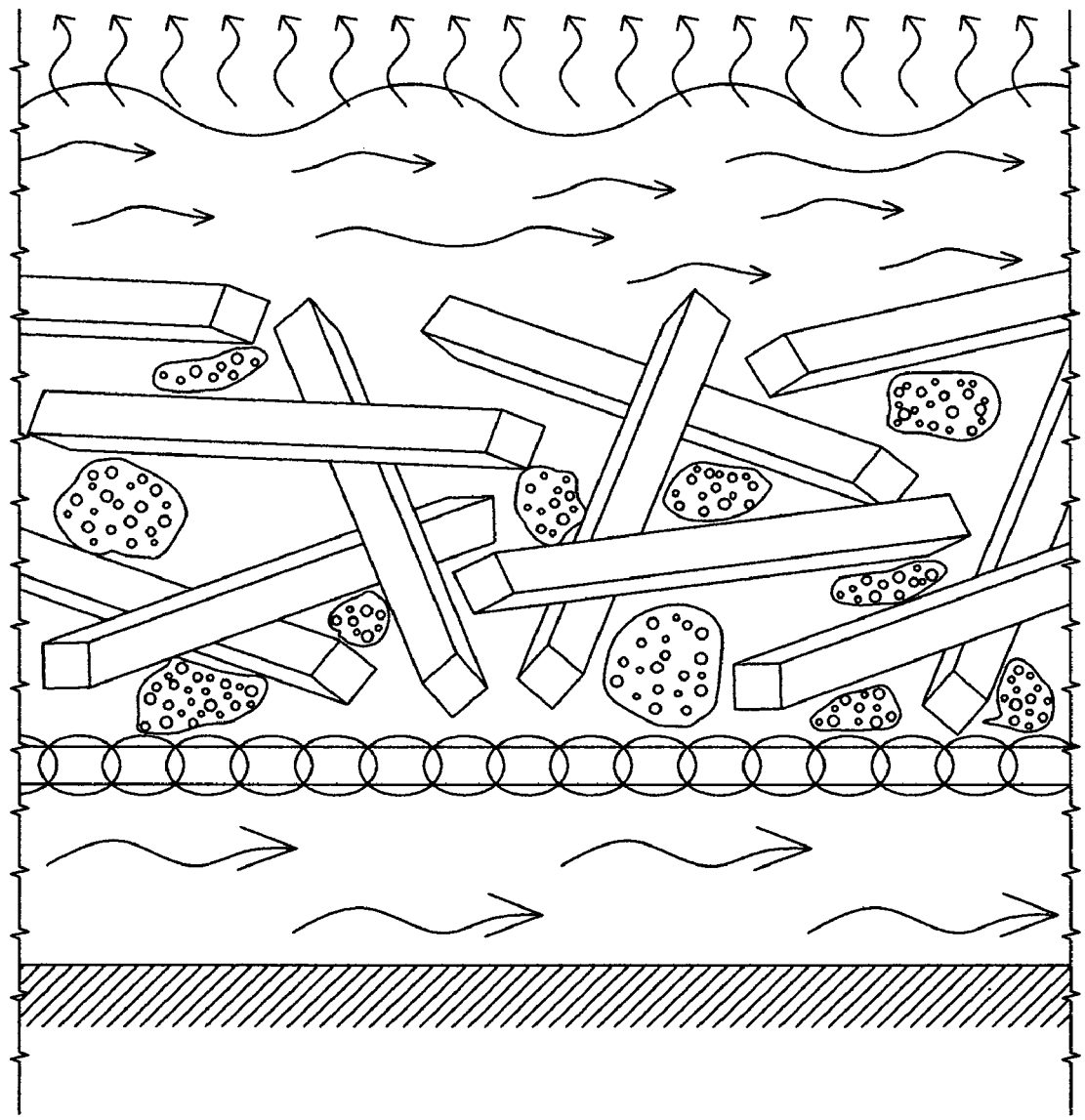

It will be understood that contact of the pack of potato strips 28 with the cooking oil 23 occurs in the fryer 10 in the zone between the pan inner walls 26, as indicated in FIG. 2, and from the drop off point from the in feed conveyor 22 to the product emergent point on the inclined discharge portion 14 of the conveyor and pan, as indicated in FIG. 1. Referring specifically to FIG. 3, there is indicated by cross-hatching 29 the zone above the oil inlet manifolds 13 and above the conveyor belt 14 wherein vertical flow occurs through the strip pack 28 which may be as deep as 8 inches or more. This flow has been found to tilt the strips into a generally vertical flow orientation engendered, it is believed, by the force vector of the input oil and and the "boil" within the cooking oil. As indicated in FIG. 9, steam escaping from the "boil" flows more freely through a pack of vertically disposed slices than through a pack of supine slices, as in the prior art, FIG. 10. There, it has been long observed, the resulting slices displayed a non-uniformity of cooking. By contrast, the present vertical flow fryer system 10 results in very uniform cooking. Moreover, the depth of the slice pack 28 processed in the fryer 10 may be generally twice the depth of slice packs of prior art fryers.

Figure 7:
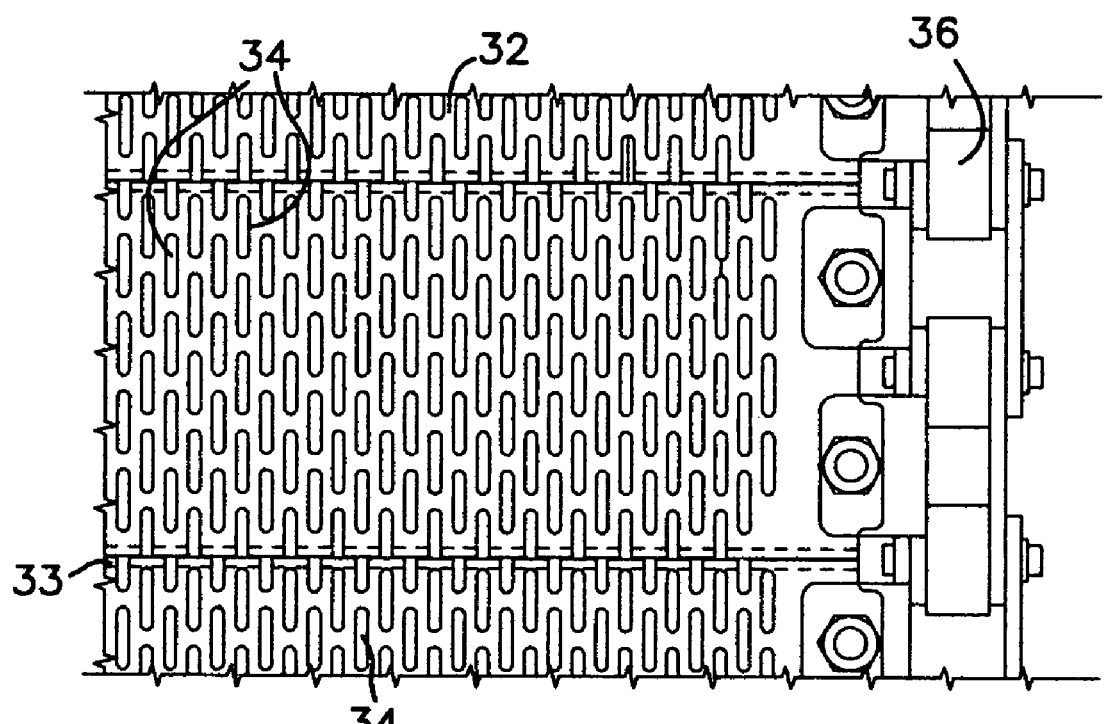
Figure 8:
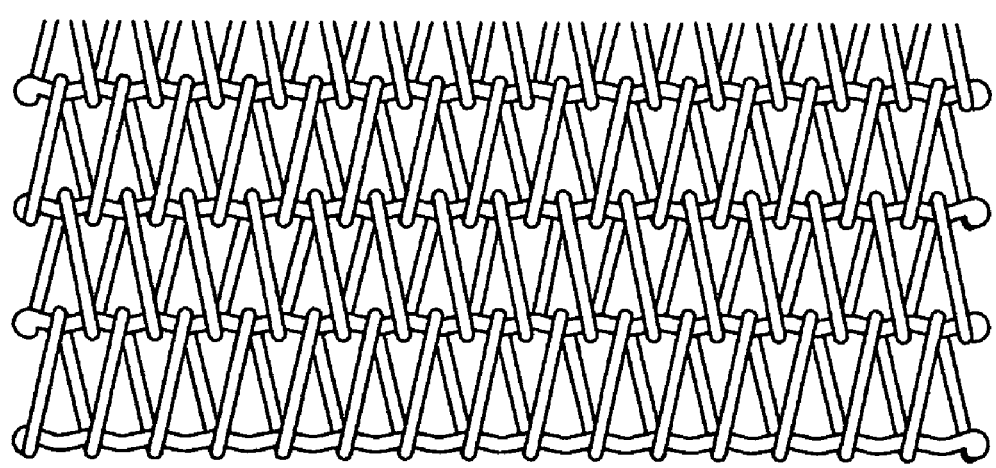
FIG. 8 is a plan view in full scale of a portion of a mesh belt product conveyor use in the practice of the present inventions.

The belt of the conveyor 12, as indicated in FIGS. 4-7, is preferably constructed as a steel slat 31 having, in lateral cross section, a channel shape comprising a broad web 32 with depending flanges 33. To facilitate the ready passage of cooking oil there through a multiplicity of slots or oil passageways 34 are formed in the web 32 of the conveyor slat 31. At each end the individual slats 31 are joined to a continuous roller chain 34, as indicated in FIGS. 5 and 7, by fasteners 38 thus constituting the conveyor belt which is driven by conventional mechanisms (not shown). A wire mesh belt 37 is shown in FIG. 8 which can serve as a satisfactory conveying belt for the fryer 10 although it is not as stiff as the slat belt of FIGS. 4-7. The mesh belt 37 is shown in full scale in FIG. 8 and affords ready passage of cooking oil there through and good support for the slice pack 28.

A number of arrows are displayed in the drawings indicating various movement of product flow or cooking oil flow. In FIG. 1 the French fry slice product flow is indicated by the arrow 15. Upward oil flow through the slice pack 28 is indicated as in FIGS. 1 and 2 by the arrows 20. The flow of cooking oil from the cooking oil outlet sump 17 through the filtering and re heating cycle as in FIG. 1 is indicated by the arrows 25.

It will be readily apparent that various modifications may be made to the structures and processes of these inventions and still be within the scope of the present invention. Accordingly, the scope of these inventions shall only be limited within terms and spirit of the following claims.

The invention claimed is:

1. A method of continuous preparation of French fried potatoes, the steps comprising, providing a vat of cooking oil including a product carrying conveyor extending the length thereof such conveyor having a multiplicity of oil flow passageways there though, such vat having oil inlet means through the bottom wall of the vat, supplying oil in an upward stream moving through the conveyor from the inlet means so as to establish a volume of cooking oil within the vat, placing in a continuous manner a multiplicity of potato strips on the conveyor in a volume so as to build a vertical pack of potato strips thereon to be moved through the cooking oil thereby creating a high energy boil off of water contained with the potato strips from the cooking oil, moving the pack of potato strips with the conveyor while the upward flowing cooking oil urges the strips into generally upward projecting positions permitting steam engendered in the water boil off to escape upwardly from the pack of potato strips, and removing the cooked French fried potato strips from the vat.

* * * * *